US012637009B2

(12) United States Patent     (10) Patent No.:   US 12,637,009 B2
Dieng et al.     (45) Date of Patent:    May 26, 2026

(54) ENVIRONMENT MONITORING APPARATUS AND METHOD FOR OPERATING AN ENVIRONMENT MONITORING APPARATUS

(71) Applicant: SICK AG, Waldkirch (DE)

(72) Inventors: Thomas Dieng, Freiburg (DE);
Mareike Stulz, Waldkirch (DE);
Matthias Heinz, Waldkirch (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 18/972,783

(22) Filed: Dec. 6, 2024

(65) Prior Publication Data

US 2025/0187542 A1     Jun. 12, 2025

(30) Foreign Application Priority Data

Dec. 7, 2023    (EP) ..................................... 23214914

(51) Int. Cl.
*B60R 1/23*       (2022.01)
*B60R 1/31*       (2022.01)
*G06T 3/047*       (2024.01)
(52) U.S. Cl.
CPC .................. *B60R 1/23* (2022.01); *B60R 1/31* (2022.01); *G06T 3/047* (2024.01); *B60R 2300/107* (2013.01); *B60R 2300/304* (2013.01)
(58) Field of Classification Search
CPC ....... B60R 1/23; B60R 1/31; B60R 2300/107; B60R 2300/304; G06T 3/047; H04N 13/00; G03B 7/085; G03B 7/095; G03B 9/24; G03B 9/30; G03B 9/38; G03B 7/087; G03B 7/097; G03B 35/24
See application file for complete search history.

(56) References Cited

U.S. PATENT DOCUMENTS 9,091,862 B2 *   7/2015   Mertz .................. G02B 21/361
11,007,018 B2 *   5/2021   Breisacher ............. H04N 23/60
(Continued)

OTHER PUBLICATIONS

Official Letter dated Oct. 9, 2024 issued in corresponding European Application No. 23214914.6.

(Continued)

*Primary Examiner* — Brian P Yenke
(74) *Attorney, Agent, or Firm* — Nath, Goldberg & Meyer; Jerald L. Meyer

(57)            ABSTRACT

An environment monitoring apparatus for vehicles comprises a stereo camera that has two fisheye lenses, an image sensor apparatus having at least two sensor regions for detecting optical signals of the fisheye lenses in a respective one of the sensor regions and for generating and outputting image data signals based on the respective optical signals, wherein the sensor regions each have at least a first part region, which corresponds to a first aperture angle within the maximum aperture angle of the respective fisheye lens, and a second part region that corresponds to a second aperture angle within the maximum aperture angle of the respective fisheye lens, a processing unit for processing the image data signals output by the image sensor apparatus and for providing the processed image data signals, wherein the processing unit can be set in order, in particular at a respective point in time, to selectively process the image data signals corresponding to only one of the part regions, and a control unit for setting the processing unit.

17 Claims, 3 Drawing Sheets

(56)        References Cited

U.S. PATENT DOCUMENTS

Figure 1:
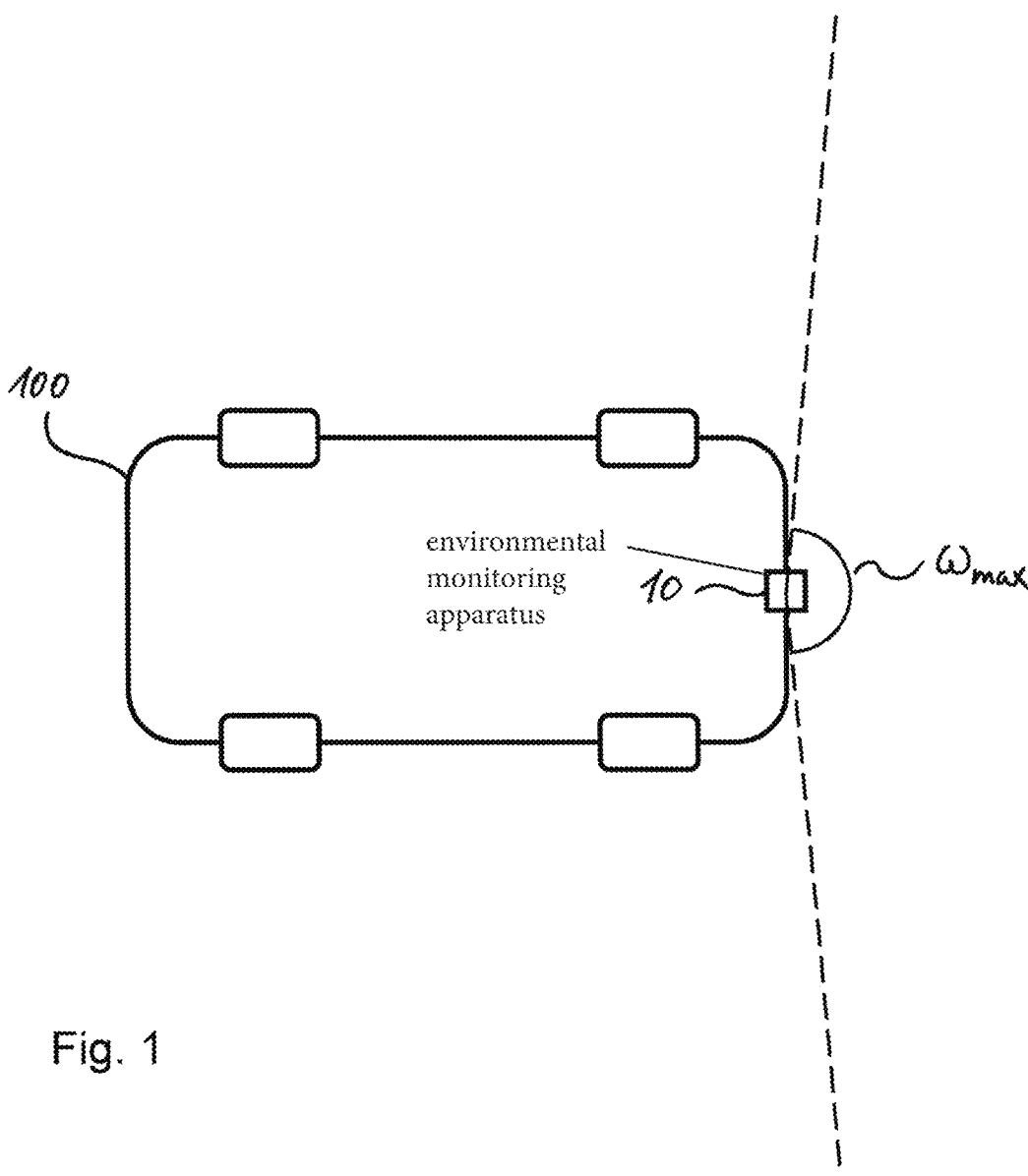

| | | | |
|---|---|---|---|
| 11,153,481 B2 * | 10/2021 | Rey ...................... | H04N 13/189 |
| 2005/0265619 A1 | 12/2005 | Ozaki | |
| 2016/0042522 A1 * | 2/2016 | Wajs ...................... | H04N 23/60 |
| | | | 348/335 |
| 2016/0255330 A1 * | 9/2016 | Wippermann ....... | H04N 13/232 |
| | | | 348/49 |
| 2018/0203212 A1 * | 7/2018 | Tzuang .............. | G02B 13/0035 |
| 2019/0387149 A1 | 12/2019 | Breisacher et al. | |
| 2020/0296281 A1 * | 9/2020 | Rey ...................... | H04N 13/117 |
| 2022/0038646 A1 * | 2/2022 | Lasaruk ................. | H04N 13/25 |
| 2023/0206386 A1 * | 6/2023 | Kobayashi ............. | G06T 3/047 |
| | | | 382/103 |
| 2025/0056109 A1 * | 2/2025 | Attar ...................... | G03B 7/095 |
| 2025/0126369 A1 * | 4/2025 | Nakatogawa .......... | H04N 23/95 |
| 2025/0147403 A1 * | 5/2025 | Ishikawa ................ | G03B 35/08 |
| 2025/0328057 A1 * | 10/2025 | Tamura ................. | G03B 7/095 |

OTHER PUBLICATIONS

Search Report dated May 16, 2024 issued in corresponding European Application No. 23214914.6.

* cited by examiner

ENVIRONMENT MONITORING APPARATUS AND METHOD FOR OPERATING AN ENVIRONMENT MONITORING APPARATUS

The invention relates to an environment monitoring apparatus for vehicles, in particular for construction machines or agricultural machines, and a method for operating an environment monitoring apparatus.

There is a rapidly growing demand for 3D sensor technology in vehicles and in particular in agricultural machines and construction machines. This demand arises from assistance functions for manned vehicles, but also increasingly from the corresponding functionality of unmanned vehicles. For sensor technology, the most cost-effective solutions possible are required to cover the widest possible range of applications, hereinafter also referred to as "application".

A large aperture angle is fundamentally necessary for the environment monitoring of vehicles. However, a smaller aperture angle offers advantages such as an improved depth accuracy and a larger distance range. To be able to cover all required applications, different device variants are therefore required with which different aperture angles can be represented.

This can, for instance, be achieved by using different device variants depending on the application. However, this solution is cost-intensive since a vehicle or an application has to be equipped with a plurality of devices operated in parallel. Motorized zoom lenses can also be used. However, stereo technology is heavily dependent on the quality of the geometric calibration. With motorized zoom lenses, all setting options must be calibrated and reproducibly settable, which leads to a great effort and high costs.

It is an object of the present invention to propose an environment monitoring apparatus and a method for operating an environment monitoring apparatus, by which apparatus and method a large range of applications can be executed with low complexity and low costs.

This object is satisfied by the subject of the independent claims. Advantageous further developments are the subject of the dependent claims and can additionally be seen from the description and the drawings.

The environment monitoring apparatus according to the invention serves for the use in vehicles, in particular construction machines or agricultural machines, and comprises a stereo camera that has two fisheye lenses, an image sensor apparatus having at least two sensor regions for detecting optical signals of the fisheye lenses in a respective one of the sensor regions and for generating and outputting image data signals based on the respective optical signals, a processing unit for processing the image data signals output by the image sensor apparatus and for providing the processed image data signals, in particular for use by an application currently executed by the environment monitoring apparatus, and a control unit. The sensor regions each have at least a first part region, which corresponds to a first aperture angle within the maximum aperture angle of the respective fisheye lens, and a second part region that corresponds to a second aperture angle within the maximum aperture angle of the respective fisheye lens. The processing unit can be set to selectively process the image data signals corresponding to only one of the part regions. The control unit is configured to set the processing unit, in particular to one of the part regions, so that the image data signals are processed, in particular at a respective point in time, corresponding to only this part region.

According to the invention, it is possible to read out image data signals from the image sensor apparatus once and to then, preferably, process them in at least two different ways, namely once for the first part region and once for the second part region. The processing unit can therefore be optionally (i.e. selectively) set to process either image data signals of the first or the second part region. In this way, it is possible, for example, to first achieve a high accuracy in the depth resolution in the first part region, whereas a large image field is then e.g. covered by the second part region. It is also possible to read out the image data signals separately for each part region, in particular only from the parts of the sensor regions that provide image data for the corresponding part region. The readout for different part regions can then take place successively in time.

The image sensor apparatus can generally either have a separate image sensor for each fisheye lens, or the image sensor apparatus has an image sensor onto which both fisheye lenses project. This means that the sensor regions can either be regions of a single image sensor that are arranged next to one another or can also partly overlap, or they can be regions of two different image sensors within the image sensor apparatus. The sensor regions can in particular each be configured as a two-dimensional arrangement (array), e.g. as CMOS or CCD image sensors, that receives optical signals from the respective fisheye lens and generates electronic signals, the image data signals, based thereon.

The first and the second aperture angle differ from one another and are smaller than the maximum aperture angle or correspond thereto. Thus, the first part region and the second part region also differ from one another. The maximum aperture angle of the fisheye lenses can, for instance, correspond to approximately 180° or be only slightly less than 180° and can be in a range from 170° to 180°. The first aperture angle can, for example, be in a range from 60° to 100° and can preferably amount to 60° or 90°. The second aperture can, for example, be in a range from 100° to 160° and can preferably amount to 130° or 140°.

The sensor regions can be configured such that less than the maximum aperture angle of a fisheye lens is mapped onto the sensor region. The aperture angle mapped onto the sensor region can in particular correspond to the second aperture angle. The second part region can then correspond to the complete sensor region of a fisheye lens.

The first part region and the second part region can preferably be rectangular. Further preferably, the first part region can be completely included in the second part region, wherein the first part region e.g. occupies half or a quarter of the area of the second part region.

The fisheye lens can in particular be an equidistant fisheye lens.

By setting the processing unit, the image data signals are processed corresponding to only one of the part regions. Thus, the processing unit can be set by the control unit so that the image data signals are only processed for this part region. This makes it possible that it can be set by the control unit whether image data are used either only for a small or for a large aperture angle since only the image data signals processed by the processing unit are provided for use by the application. The setting of the processing unit by the control unit can in particular be dependent on the executed application so that, depending on the application, image data can be obtained either with a large aperture angle or with a smaller aperture angle compared thereto, but with an improved depth accuracy and a larger distance range in return.

The processing unit can preferably be set during operation of the stereo camera to selectively process the image data signals corresponding to only one of the part regions. During operation means that it is also possible during the run time to switch between the part regions that correspond to the respective aperture angles. In other words, image data signals can first be processed corresponding to a large aperture angle and subsequently corresponding to a smaller aperture angle, or vice versa, and can be provided for the application if, for instance, the application executed by the environment monitoring apparatus is changed during operation.

A resolution of the processed image data signals can be independent of the setting of the processing unit to one of the part regions. For the best possible lateral object resolution, the highest possible image resolution is just as necessary as for the best possible depth resolution. However, apart from the computing power, the image resolution achieved is only limited by the lens and the resolution of the image sensor. With fisheye lenses, due to the imaging with a barrel-shaped distortion, the scene information that is mapped onto a pixel is higher at the margin of the image than at the center of the image, with this effect becoming greater the larger the aperture angle is. At the maximum aperture angle, the maximum resolution of the processed image is thus only limited by the marginal regions of the input image, i.e. of the image data signals output by the image sensor apparatus, which causes a loss of information at the center. With a comparatively smaller aperture angle, however, the complete information at the image center of the image data signals received from the image sensor apparatus can be used since the marginal regions are not required here. In simplified terms, with a comparatively large aperture angle, the image data signals are reduced in size during the processing, whereas, with a comparatively small aperture angle, the processed image can be approximately the same size as the image obtained from the image sensor apparatus or the obtained image data signals.

The processing unit is advantageously configured to rectify the image data signals during the processing. Rectification means that the image data signals are changed such that, among other things, geometric imaging errors are corrected. A rectified single image has the property of a uniform imaging scale over the entire image region. An object at any position in the image is thereby mapped onto the same number of pixels. The rectification can in particular include establishing the stereo normal case in which the distortion of the respective fisheye lens is corrected, on the one hand, and the camera pair or lens pair is aligned with one another, on the other hand. In this respect, the two cameras are aligned with one another so that horizontal lines in the scene can be found again in the rectified stereo image pair on an image line.

The rectification of the image data signals can comprise stretching the image margins and/or compressing the image center. Furthermore, the rectification can differ depending on the setting of the processing unit to one of the part regions. In particular, less correction of imaging errors is required when setting to a part region that corresponds to a smaller aperture angle in comparison than when setting to a part region that corresponds to a larger aperture angle in comparison.

The rectification can furthermore comprise changing a resolution of the image data signals. The rectification can be followed by the scaling. In particular, the resolution of the processed image data signals, i.e. after the rectification and, possibly, the scaling, can be the same in each case, and indeed irrespective of the part region corresponding to which the image data signals are processed. Thus, image data signals are always provided with the same resolution for further use, which considerably simplifies the downstream further processing, for example by a FPGA (Field Programmable Gate Array) or ASIC (application-specific integrated circuit), and reduces the computing power.

Thus, 2D data and depth data with different properties can be generated by different image rectifications. Either an image with a large aperture angle but a limited depth resolution and a lower lateral resolution for recognizing objects or an image with an improved lateral resolution and depth resolution but a limited aperture angle can be generated, wherein both images can have the same resolution.

The image sensor apparatus can additionally be settable to selectively generate and output the image data signals corresponding to only one of the part regions. In this case, the control unit can be configured to set the image sensor apparatus accordingly, in particular to one of the part regions, so that the image data signals are generated and output based on the optical signals received for only this part region. For example, only the pixels of one part region can therefore be read out. Thus, the generation and output of image data signals by the image sensor apparatus can, for example, be limited to a predefined aperture angle and the amount of image data signals to be transmitted can be reduced.

The method according to the invention serves to operate an environment monitoring apparatus that comprises a stereo camera having two fisheye lenses and an image sensor apparatus having at least two sensor regions for detecting optical signals of the fisheye lenses in a respective one of the sensor regions and for generating and outputting image data signals based on the respective optical signals, wherein the sensor regions each comprise at least a first part region, which corresponds to a first aperture angle within the maximum aperture angle of the respective fisheye lens, and a second part region that corresponds to a second aperture angle within the maximum aperture angle of the respective fisheye lens. The method comprises the following steps:

generating an application requirement based on an application currently executed by the environment monitoring apparatus, receiving the image data signals output by the image sensor apparatus and processing, in particular at a respective point in time, the image data signals corresponding to only one of the part regions selectively in dependence on the application requirement, and providing the processed image data signals, in particular using the processed image data signals by the application.

According to the method, depending on the application executed, the application requirement is generated that includes information regarding which application is currently executed by the environment monitoring apparatus or which image data signals are required by the application, i.e. image data signals corresponding to which of the available aperture angles within the maximum aperture angle, for example corresponding to the first aperture angle or the second aperture angle. The application requirement thus defines whether image data signals with a large or a small aperture angle are required. The image data signals are then processed corresponding to only that part region which corresponds to the desired aperture angle.

The image data signals are preferably rectified during the processing before the provision. As regards rectification, reference is made to the above statements. The rectification of the image data signals can comprise stretching the image margins and/or compressing the image center. Furthermore, the rectification may differ depending on the processing of the image data signals corresponding to only one of the part regions. The resolution of the image data signals can furthermore be changed during the rectification.

The method preferably comprises the following steps:

processing and rectifying the image data signals corresponding to only the first part region, followed by the processing and rectification of the image data signals corresponding to only the second part region, and the merging of the rectified image data signals corresponding to the first part region and the rectified image data signals corresponding to the second part region to form merged image data signals.

Image data signals corresponding to a smaller and a larger aperture angle can thereby be processed in parallel and subsequently merged. The merging can in particular be made simple and efficient if certain calibration parameters are restricted so that a multiple of the focal length (e.g. twice) is required for the different aperture angles. The merging results in image data that have a lateral resolution and depth resolution at the image center that is a multiple of the focal length (e.g. twice) compared to the image margin.

The invention further relates to an apparatus for data processing comprising a device for performing the above-described method, a computer program comprising commands that, on the execution of the program by a computer, cause the computer to perform the above-described method, and a computer-readable storage medium comprising commands that, on the execution by a computer, cause the computer to perform the above-described method.

The statements made above in connection with the environment monitoring apparatus apply equally to the method for operating an environment monitoring apparatus and vice versa. The same applies to the apparatus for data processing, the computer program and the computer-readable storage medium.

Figure 2:
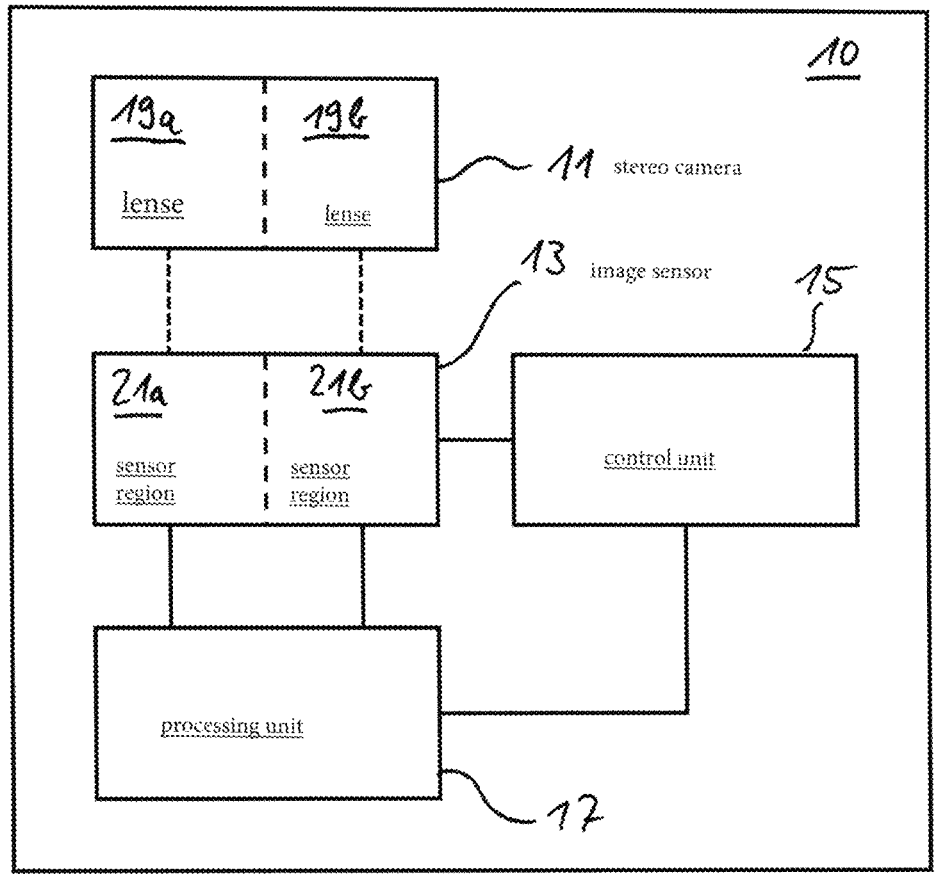
Figure 3:
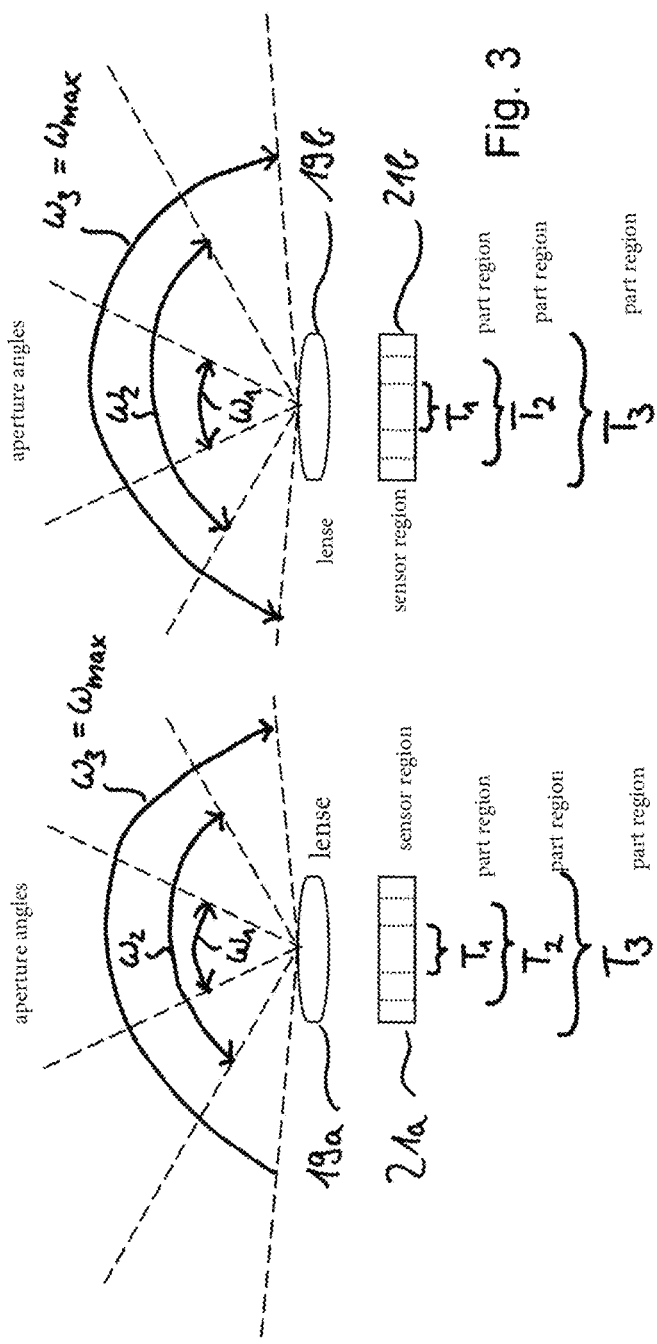

The invention will be explained in the following purely by way of example with reference to an embodiment example schematically shown in the drawings. There are shown:

FIG. 1 a schematic representation of a vehicle with an environment monitoring apparatus according to an embodiment example;

FIG. 2 a diagram that schematically illustrates the design of the environment monitoring apparatus from FIG. 1; and FIG. 3 a schematic representation of the stereo camera with the fisheye lenses and the associated sensor regions of the environment monitoring apparatus from FIG. 1.

A vehicle 100, which can in particular be designed as a construction machine or an agricultural machine, is schematically shown in FIG. 1. The vehicle 100 has, in its front region, an environment monitoring apparatus 10 that will be described in more detail below. It is generally conceivable that environment monitoring apparatuses 10 could be arranged at the sides or at the rear of the vehicle 100 in addition to the front or as an alternative thereto.

As FIG. 2 shows, the environment monitoring apparatus 10 has a stereo camera 11, which comprises two fisheye lenses 19a, 19b arranged and aligned in parallel with one another, an image sensor apparatus 13, a control unit 15, and a processing unit 17.

The fisheye lenses 19a, 19b indicated in a lens shape in FIG. 3 each have a maximum aperture angle $\omega_{max}$ that may only be slightly smaller than 180° and is approximately in the range from 170° to 180°. However, depending on the application to be performed by the environment monitoring apparatus 10, it may also be necessary to obtain image data for a smaller aperture angle in order to obtain an improved depth accuracy and a larger distance range. This is solved by the present embodiment example as follows:

In the present example, the image sensor apparatus 13 has two sensor regions 21a, 21b. The sensor regions 21a, 21b are here each associated with a separate image sensor. These two image sensors are part of the image sensor apparatus 13. In other embodiments, however, it can also be possible that both sensor regions 21a, 21b are provided by only one image sensor that is, however, at least functionally divided in itself.

The two sensor regions receive and detect optical signals from the respective associated fisheye lens 19a, 19b, i.e. the sensor region 21a is associated with the fisheye lens 19a, and the sensor region 21b is associated with the fisheye lens 19b. Electronic image data signals are generated and output based on the detected optical signals.

In the present example, each sensor region 21a, 21b is divided into part regions T1, T2, T3, wherein, in this case, the part region T3 includes the part region T2 and the part region T2 in turn includes the part region T1. However, it is generally also conceivable that the part regions T1, T2, T3 of the respective sensor region 21a, 21b are part regions of the sensor region 21a, 21b arranged next to one another without overlapping. The division of the sensor regions 21a, 21b into their part regions T1, T2, T3 is here to be understood such that the sensor regions 21a, 21b are configured as a two-dimensional arrangement (array), wherein the part regions T1, T2, T3 each correspond to a part of this two-dimensional arrangement in which in each case optical signals of the associated fisheye lens 19a, 19b are received corresponding to a respective aperture angle $\omega_1$, $\omega_2$, $\omega_3$.

The first part region T1 corresponds in each case to a first aperture angle $\omega_1$ of the respective fisheye lens 19a, 19b. This means that the optical signals received in this part region T1 reproduce the objects present within the first aperture angle $\omega_1$. Similarly, the second part region T2 corresponds to a second aperture angle $\omega_2$ and the third part region T3 corresponds to a third aperture angle $\omega_3$ of the respective fisheye lens 19a, 19b. The aperture angles $\omega_1$, $\omega_2$, $\omega_3$ lie within the maximum aperture angle $\omega_{max}$ of the fisheye lenses 19a, 19b. In this case, the third aperture angle $\omega_3$ corresponds to the maximum aperture angle $\omega_{max}$ in each case, whereas the two aperture angles $\omega_1$ and $\omega_2$ are smaller than said maximum aperture angle $\omega_{max}$.

The control unit 15 is connected to the processing unit 17 via a signal connection and can set the processing unit 17 to one of the part regions T1, T2, T3. This means that, depending on the setting, the processing unit 17, which is connected to the image sensor apparatus 13 in a signal-conducting manner and receives the image data signals from the image sensor apparatus 13, only processes the image data signals corresponding to one of the part regions T1, T2, T3. In other words, the processing unit 17 knows the pixel regions of the image data signals received by the image sensor apparatus 13 that correspond to the part regions T1, T2, T3 and, for the further processing, only uses the pixel region of the image data signals that corresponds to the respective part region T1, T2, T3. The setting of the processing unit 17 by the control unit 15 in particular takes place based on an application requirement that includes information regarding which application is currently executed by the environment monitoring apparatus 10 or which image data signals are required by the application, i.e. image data signals corresponding to which of the available aperture angles $\omega_1$, $\omega_2$, $\omega_3$. The processing unit 17 is thus set to one of the part regions T1, T2, T3 so that the image data signals are selectively processed corresponding to only that part region T1, T2, T3 which corresponds to the desired aperture angle $\omega_1$, $\omega_2$, $\omega_3$.

As part of the processing, the processing unit 17 performs a rectification of the image data signals. In this respect, geometric imaging errors are corrected that are clearly evident in particular in fisheye lenses with large aperture angles. The rectification can in particular include establishing the stereo normal case in which the distortion of the respective fisheye lens is corrected, on the one hand, and the camera pair or lens pair is aligned with one another, on the other hand.

During the rectification of the image data signals by the processing unit 17, the image margins are in particular stretched and the image center is compressed. However, the rectification can be differently pronounced depending on the aperture angle. In particular, a more pronounced rectification is required for a comparatively large aperture angle, at which a more pronounced distortion occurs, than for a small aperture angle.

Thus, 2D data and depth data with different properties can be generated by different image rectifications. Either an image with a large aperture angle but a limited depth resolution and a lower lateral resolution for recognizing objects or an image with an improved lateral resolution and depth resolution but a limited aperture angle can be generated, wherein both images can have the same resolution. The present embodiment therefore results in an environment monitoring apparatus 10 which has a comparatively low complexity and can be manufactured at low cost and with which a wide range of applications can furthermore be executed since corresponding image data can be provided depending on the application.

REFERENCE NUMERAL LIST

10 environment monitoring apparatus
11 stereo camera
13 image sensor apparatus
15 control unit
17 processing unit
19*a* fisheye lens
19*b* fisheye lens
21*a* sensor region
21*b* sensor region
100 vehicle
T1 part region
T2 part region
T3 part region
$\omega_{max}$ maximum aperture angle
$\omega_1$ aperture angle
$\omega_2$ aperture angle
$\omega_3$ opening angle

The invention claimed is:

1. An environment monitoring apparatus for vehicles, said environment monitoring apparatus comprising:
   a stereo camera that has two fisheye lenses;
   an image sensor apparatus having at least two sensor regions for detecting optical signals of the fisheye lenses in a respective one of the sensor regions and for generating and outputting image data signals based on the respective optical signals, wherein the sensor regions each have at least a first part region, which corresponds to a first aperture angle within the maximum aperture angle of the respective fisheye lens, and a second part region that corresponds to a second aperture angle within the maximum aperture angle of the respective fisheye lens;
   a processing unit for processing the image data signals output by the image sensor apparatus and for providing the processed image data signals, wherein the processing unit can be set in order to selectively process the image data signals corresponding to only one of the part regions; and
   a control unit for setting the processing unit.

2. The environment monitoring apparatus according to claim 1, wherein the vehicles are one of construction machines and agricultural machines.

3. The environment monitoring apparatus according to claim 1, wherein the processing unit can be set at a respective point in time to selectively process the image data signals corresponding to only one of the part regions.

4. The environment monitoring apparatus according to claim 1, wherein the processing unit can be set during operation of the stereo camera to selectively process the image data signals corresponding to only one of the part regions.

5. The environment monitoring apparatus according to claim 1, wherein a resolution of the processed image data signals is independent of the setting of the processing unit to one of the part regions.

6. The environment monitoring apparatus according to claim 1, wherein the processing unit is configured to rectify the image data signals during the processing.

7. The environment monitoring apparatus according to claim 1, wherein the image sensor apparatus can be set to selectively generate and output the image data signals corresponding to only one of the part regions.

8. A method for operating an environment monitoring apparatus, said environment monitoring apparatus comprising:
   a stereo camera having two fisheye lenses; and
   an image sensor apparatus having at least two sensor regions for detecting optical signals of the fisheye lenses in a respective one of the sensor regions and for generating and outputting image data signals based on the respective optical signals, wherein the sensor regions each comprise at least a first part region, which corresponds to a first aperture angle within the maximum aperture angle of the respective fisheye lens, and a second part region that corresponds to a second aperture angle within the maximum aperture angle of the respective fisheye lens,
   wherein the method comprises the following steps:
      generating an application requirement based on an application currently executed by the environment monitoring apparatus wherein the application requirement defines whether image data signals with a large or a small aperture angle are required;
      receiving the image data signals output by the image sensor apparatus and processing the image data signals corresponding to only one of the part regions selectively in dependence on the application requirement; and
      providing the processed image data signals.

9. The method according to claim 8, wherein the step of receiving the image data signals output by the image sensor apparatus and processing the image data signals is carried out at a respective point in time corresponding to only one of the part regions selectively in dependence on the application requirement.

10. The method according to claim 8, wherein the image data signals are rectified during the processing before the provision.

11. The method according to claim 10, wherein the rectification of the image data signals comprises stretching the image margins and/or compressing the image center.

12. The method according to claim 10, wherein the rectification differs depending on the processing of the image data signals corresponding to only one of the part regions.

13. The method according to claim 10, wherein the rectification comprises changing a resolution of the image data signals.

14. The method according to claim 8, further comprising the steps of:

processing and rectification of the image data signals corresponding to only the first part region, followed by the processing and rectification of the image data signals corresponding to only the second part region, and the merging of the rectified image data signals corresponding to the first part region and the rectified image data signals corresponding to the second part region to form merged image data signals.

15. An apparatus for data processing comprising a device for performing a method for operating an environment monitoring apparatus, said environment monitoring apparatus comprising:

a stereo camera having two fisheye lenses; and an image sensor apparatus having at least two sensor regions for detecting optical signals of the fisheye lenses in a respective one of the sensor regions and for generating and outputting image data signals based on the respective optical signals, wherein the sensor regions each comprise at least a first part region, which corresponds to a first aperture angle within the maximum aperture angle of the respective fisheye lens, and a second part region that corresponds to a second aperture angle within the maximum aperture angle of the respective fisheye lens, wherein the method comprises the following steps:

generating an application requirement based on an application currently executed by the environment monitoring apparatus wherein the application requirement defines whether image data signals with a large or a small aperture angle are required;

receiving the image data signals output by the image sensor apparatus and processing the image data signals corresponding to only one of the part regions selectively in dependence on the application requirement; and providing the processed image data signals.

16. A non-transitory computer readable medium comprising commands that, on the execution of the program by a computer, cause the computer to perform a method for operating an environment monitoring apparatus, said environment monitoring apparatus comprising:

a stereo camera having two fisheye lenses; and an image sensor apparatus having at least two sensor regions for detecting optical signals of the fisheye lenses in a respective one of the sensor regions and for generating and outputting image data signals based on the respective optical signals, wherein the sensor regions each comprise at least a first part region, which corresponds to a first aperture angle within the maximum aperture angle of the respective fisheye lens, and a second part region that corresponds to a second aperture angle within the maximum aperture angle of the respective fisheye lens, wherein the method comprises the following steps:

generating an application requirement based on an application currently executed by the environment monitoring apparatus wherein the application requirement defines whether image data signals with a large or a small aperture angle are required;

receiving the image data signals output by the image sensor apparatus and processing the image data signals corresponding to only one of the part regions selectively in dependence on the application requirement; and providing the processed image data signals.

17. A non-transitory computer-readable storage medium comprising commands that, on the execution by a computer, cause the computer to perform a method for operating an environment monitoring apparatus, said environment monitoring apparatus comprising:

a stereo camera having two fisheye lenses; and an image sensor apparatus having at least two sensor regions for detecting optical signals of the fisheye lenses in a respective one of the sensor regions and for generating and outputting image data signals based on the respective optical signals, wherein the sensor regions each comprise at least a first part region, which corresponds to a first aperture angle within the maximum aperture angle of the respective fisheye lens, and a second part region that corresponds to a second aperture angle within the maximum aperture angle of the respective fisheye lens, wherein the method comprises the following steps:

generating an application requirement based on an application currently executed by the environment monitoring apparatus wherein the application requirement defines whether image data signals with a large or a small aperture angle are required;

receiving the image data signals output by the image sensor apparatus and processing the image data signals corresponding to only one of the part regions selectively in dependence on the application requirement; and providing the processed image data signals.

* * * * *